(12) United States Patent
Mermelstein (10) Patent No.: US 6,906,806 B2
(45) Date of Patent: Jun. 14, 2005

(54) METHOD AND APPARATUS FOR MEASURING MOTION

(76) Inventor: Michael Mermelstein, 25 Clarendon St., Watertown, MA (US) 02472

( * ) Notice: Subject to any disclaimer, the term of this patent is extended or adjusted under 35 U.S.C. 154(b) by 313 days.

(21) Appl. No.: 10/355,509

(22) Filed: Jan. 31, 2003

(65) Prior Publication Data
US 2004/0150832 A1 Aug. 5, 2004

(51) Int. Cl.[7] ................................................ G01B 9/02

(52) U.S. Cl. ...................................................... 356/497

(58) Field of Search ................................ 356/497, 498, 356/500, 501, 502

(56) References Cited

U.S. PATENT DOCUMENTS

| | | | |
|---|---|---|---|
| 4,340,306 A | 7/1982 | Balasubramanian |
| 4,554,836 A | 11/1985 | Rudd |
| 4,818,110 A | 4/1989 | Davidson |
| 5,133,601 A | 7/1992 | Cohen et al. |
| 5,204,734 A | 4/1993 | Cohen et al. |
| 5,398,113 A | 3/1995 | de Groot |
| 5,471,303 A | 11/1995 | Ai et al. |
| 5,481,360 A | 1/1996 | Fujita |
| 5,953,124 A | 9/1999 | Deck |
| 6,243,168 B1 | 6/2001 | Heflinger et al. |
| 6,320,665 B1 | 11/2001 | Ngoi et al. |
| 2002/0141039 A1 | 10/2001 | Mermelstein |

OTHER PUBLICATIONS

Aswendt et al. "Testing Microcomponents by Speckle Interfermoetry," *Part of the EUROPTO Conference on Microsystems Metrology and Inspection, Munich, Germany—Jun. 1999,*SPIE vol. 8325, pp. 165–173.

Bhushan et al. "Measurement of Surface Topography of Magnetic Tapes by Mirau Interferometry," Applicced Optics, vol. 24. No. 10, pp. 1489–1497 (1985).

Blackshire et al. "Scanning Laser Interferometric Evaluation of Individual Elements and an Entire Micro–Electro–Mechanical Ultrasonic Array Transducer," *2001 IEEE Ultrasonics Symposium,* pp. 883–886.

Blackshire et al. "Characterization of MEMS Transducer Performance Using Near–Field Scanning Interferometry," *IEEE Transactions on Ultrasonics, Ferroelectrics, and Frequency Control,* vol. 49, No. 5, pp. 669–674, May 2002.

Bosseboeuf et al. "3D Full Field Dynamical Characterization of Micromechanical Devices by Stroboscopic White Light Scanning Interferometry," *Proc. Lasers in Metrology and Art Conservation. Conf. Microsystems Engineering Metrology and Inspection II,* Munich, Jun. 19–21 (2001), 7 pgs.

(Continued)

*Primary Examiner*—Gregory J. Toatley, Jr.
*Assistant Examiner*—Michael A. Lyons (57) ABSTRACT

A method and apparatus for measuring motion of an object substantially orthogonal to an optical axis of an interferometer. The method includes the steps of obtaining a first interferogram and a second interferogram, wherein each of the first and second interferograms includes intensity information of each of at least two pixels, and determining the motion of the object from the first and the second interferograms in response to the difference of the intensity gradients of the pixels in the first and second interferograms in the orthogonal direction. The system includes a first interferogram including intensity information of each of at least two pixels and a second interferogram including intensity information of each of at least two pixels. The system also includes a gradient processor calculating the intensity gradients of the first and second interferograms in the orthogonal direction and a motion processor calculating the motion of the object from the first and the second interferograms in response to the difference of the intensity gradients of the first and second interferograms in the orthogonal direction.

40 Claims, 6 Drawing Sheets

OTHER PUBLICATIONS

Bosseboeuf et al. "A Versatile Microscopic Profilometer–Vibrometer for Static and Dynamic Characterization of Micromechanical Devices," *Part of the EUROPTO Conference on Microsystems Metrology and Inspection Munich, Germany—Jun. 1999*, SPIE vol. 3825, pp. 123–133.

Davis et al. "Equivalence of Subpixel Motion Estimators Based on Optical Flow and Block Matching," *International Symposium on Computer Vision*, Coral Gables, Florida, Nov. 21–23, 1995, IEEE Computer Society Press, Los Alamitos, California, pp. 7–12.

Davis et al. "Statistics of Subpixel Registration Algorithms Based on Spatiotemporal Gradients or Block Matching," *Opt. Eng.* 37(4) 1290–1298, Apr. 1998.

Davis et al. "Using a Light Microscope to Measure Motions with Nanometer Accuracy," *Opt. Eng.* 37(4) 1299–1304, Apr. 1998.

Davis, "Measuring Nanometer, Three–Dimensional Motions with Light Microscopy," Massachusetts Institute of Technology, pp. 1–182, 1997.

Gutierrerz et al. "MEMS Metrology Station Based on Two Interferometers," *SPIE*, vol. 3225, pp. 23–31, 1997.

Guitierrez et al. "Interferometric System Images Small Vibrating Structures," National Aeronautics and Space Administration, Contract No. NAS 7–918, NASA Tech Brief, vol. 24, No. 4, Apr. 2000.

Hart et al. "Stroboscopic Interferometer System for Dynamic MEMS Characterization," *Journal of Microelectromechanical Systems*, vol. 9., No. 4, Dec. 2000.

Hemmert et al. "Nanometer Resolution of Three–Dimensional Motions Using Video Interference Microscopy," Research Laboratory of Electronics, Massachusetts Institute of Technology, Cambridge, MA, pp. 302–308, 1999.

Hill et al. "Verification of 2–D MEMS Model Using Optical Profiling Techniques," National Microelectronics Research Centre, Lee Maltings, Cork, Ireland, pp. 169–183 2001.

Karu, "East Subpixel Registration of 3–D Images," Massachusetts Institute of Technology, pp. 1–174, 1997.

Liu et al. "On the Modes and Loss Mechanisms of High Q Mechanical Oscillator," American Institute of Physics, vol. 78., No. 10, pp. 1346–1348, 2001.

Donati et al. "Measurement of MEMS Mechanical Parameters by Injection Interferometry," Department of Electronics, University of Pavia, Italy, pp. 89–90. 2000.

Rembe et al. "Optical Measurement Methods to Study Dynamic Behavior in MEMS," Malgorzata Kujawinska, Editors, Proceedings of SPIE vol. 4400, pp. 127–137, 2001.

Rembe et al. "Stroboscopic Interferometer with Variable Magnification to Measure Dynamics in an Adaptive–Optics Micromirror," Berkeley Sensor & Actuator Center, University of California, Berkeley, CA, pp. 73–74, 2000.

Salbut et al., "Novel Aspects of Interferometric Testing of Silicon Microelements Properties" In Micro–Opto–Electro–Mechanical Systems, Richard R. A. Syms, Editor, Proceedings of SPIE vol. 4075, pp. 109–116, 2000.

St. Clair et al., " Metrology for MEMS Manufacturing," Sensors, pp. 1–10, 2000.

Takeda et al., "Frequency–Multiplex Fourier–Transform Profilometry: A Single–Shot Three–Dimensional Shape Measurement of Objects with Large Height Discontinuities and/or Surface Isolations,"Applied Optics, vol. 36, No. 22, pp. 5347–5354, 1997.

Timoner etal., "Multi–Image Gradient–Based Algorithms for Motion," Optical Engineering, vol. 40 No. 9, pp. 2003–2016, 2001.

Timoner, "Subpixel Motion Estimation From Sequences of Video Images," Massachusetts Institute of Technology, pp. 1–107, 1999.

Wernicke et al., "Some Investigations in Holographic Interferometry with Respect to the Estimation of Stress and Strain in Micro–Opto–Electro–Mechanical Systems (MEOMS)," Optics and Lasers in Engineering, 36, pp. 475–485, 2001.

METHOD AND APPARATUS FOR MEASURING MOTION

FIELD OF THE INVENTION

The invention relates generally to the field of metrology and more specifically to the measurement of motion in micro-mechanical devices.

BACKGROUND OF THE INVENTION

The science of metrology continues to evolve as the need for precision measurement grows in various technical and industrial fields. In combination with this growth, engineers and scientists are designing devices of increasing complexity and decreasing size. In particular, much of the development in metrological research has been spurred by interest in micro-electromechanical systems and microelectro-optical systems. Measurement techniques are important in fabricating these miniature devices within certain required tolerances and for evaluating the quality of the fabricated devices. The determination of quality in such micro devices frequently includes the characterization of motion within and by the micro-devices.

When the physical characteristics of an object, such as its size or material properties, preclude direct contact between a measurement apparatus and the device being tested, other measurement techniques are often required. Various classes of optical devices and techniques are typically used to make measurements on such small devices. Laser Doppler Vibrometry, white light interferometry, laser triangulation, video microscopy, and computer vision systems are some of the existing available techniques and devices suitable for creating data sets relating information about the motion of such devices. Sophisticated algorithms and mathematical models are typically required to process the complex data produced by these techniques to obtain the information characterizing the motion of the devices.

SUMMARY OF THE INVENTION

The invention relates to a method and apparatus for measuring a motion of an object substantially orthogonal to an optical axis of an interferometer. The method includes the steps of obtaining a first interferogram and a second interferogram. Each of the first and second interferograms includes intensity information of each of at least two pixels. The method further includes the steps of determining the motion of the object from the first and the second interferograms in response to the difference of the intensity gradients of the pixels in the first and second interferograms in the orthogonal direction. In one embodiment the intensity gradients are computed from the intensity information of each of at least two pixels. The determination of the motion measurement is substantially independent of the pixel dimensions. In one embodiment the intensity gradients are measured in space and time domains. In another embodiment the intensity gradients are calculated in a transform domain.

In one embodiment the invention relates to measuring a periodic vibration of a microstructure substantially orthogonal to an optical axis of an interferometer. The method includes the steps of obtaining a first interferogram and a second interferogram, wherein each of the first and second interferograms includes intensity information of each of at least two pixels within each of the interferograms, and determining the motion of the microstructure from the first and the second interferograms in response to the difference of the intensity gradients of the pixels in the first and second interferograms in the orthogonal direction. In one embodiment the method includes measuring the periodic vibration using at least one phase of motion.

In another embodiment the invention relates to a system for measuring a motion of an object substantially orthogonal to an optical axis of an interferometer. The system includes a first interferogram including intensity information of each of at least two pixels and a second interferogram including intensity information of each of at least two pixels. The system also includes a gradient processor calculating the intensity gradients of the first and second interferograms in the orthogonal direction and a motion processor calculating the motion of the object from the first and the second interferograms in response to the difference of the intensity gradients of the first and second interferograms in the orthogonal direction. In one embodiment the gradient processor calculates the gradients in space and time domains. In another embodiment the gradient processor calculates gradients in a transform domain.

In yet another embodiment the invention relates to an apparatus for measuring motion of an object. The apparatus includes an interferometer having an optical axis recording a first interferogram and a second interferogram. Each of the first and second interferograms includes intensity information at each of at least two pixels arranged substantially orthogonal to the optical axis of the interferometer. The apparatus also includes a gradient processor calculating the intensity gradients of the first and second interferograms in a direction orthogonal to the optical axis of the interferometer and a motion processor calculating the motion of the object from the first and the second interferograms in response to the difference of the intensity gradients of the first and second interferograms in the orthogonal direction.

In still yet another embodiment the invention relates to a method for measuring the relative location of an object. The method includes the steps of obtaining a first interferometric data set including intensity information at two locations on the object and a second data set; and determining the relative location of the object in response to said first interferometric data set and the second data set, without forming a surface profile. In one embodiment the second data set comprises an interferometric data set comprising intensity information at two locations. In another embodiment the second data set includes data obtained from a mathematical model.

In yet another embodiment the invention relates to an apparatus for determining the relative location of an object. In one embodiment the apparatus includes a first interferometric data set including intensity information at two locations on the object, a second data set; and a processor determining the relative location of the object in response to the first interferometric data set and said second data set without forming a surface profile.

BRIEF DESCRIPTION OF THE DRAWINGS

The invention is pointed out with particularity in the appended claims. The advantages of this invention described above, and further advantages, may be better understood by reference to the following description taken in conjunction with the accompanying drawings, in which:

FIGS. 2(a–b) is a schematic diagram of a static object of interest being measured using interferometric techniques in accordance with the prior art;

FIGS. 3(a–b) is a schematic diagram of the object of interest of FIGS. 2(a–b) being translated in space and measured using interferometric techniques in accordance with the prior art;

FIGS. 4(a–b) is a schematic diagram of the static object of interest of FIGS. 2(a–b) being measured using interferometric techniques in accordance with the invention;

FIG. 5(a–b) is a schematic diagram of the object of interest of FIGS. 4(a–b) being translated in space and measured using interferometric techniques in accordance with the invention.

DESCRIPTION OF THE PREFERRED EMBODIMENT

Figure 1:
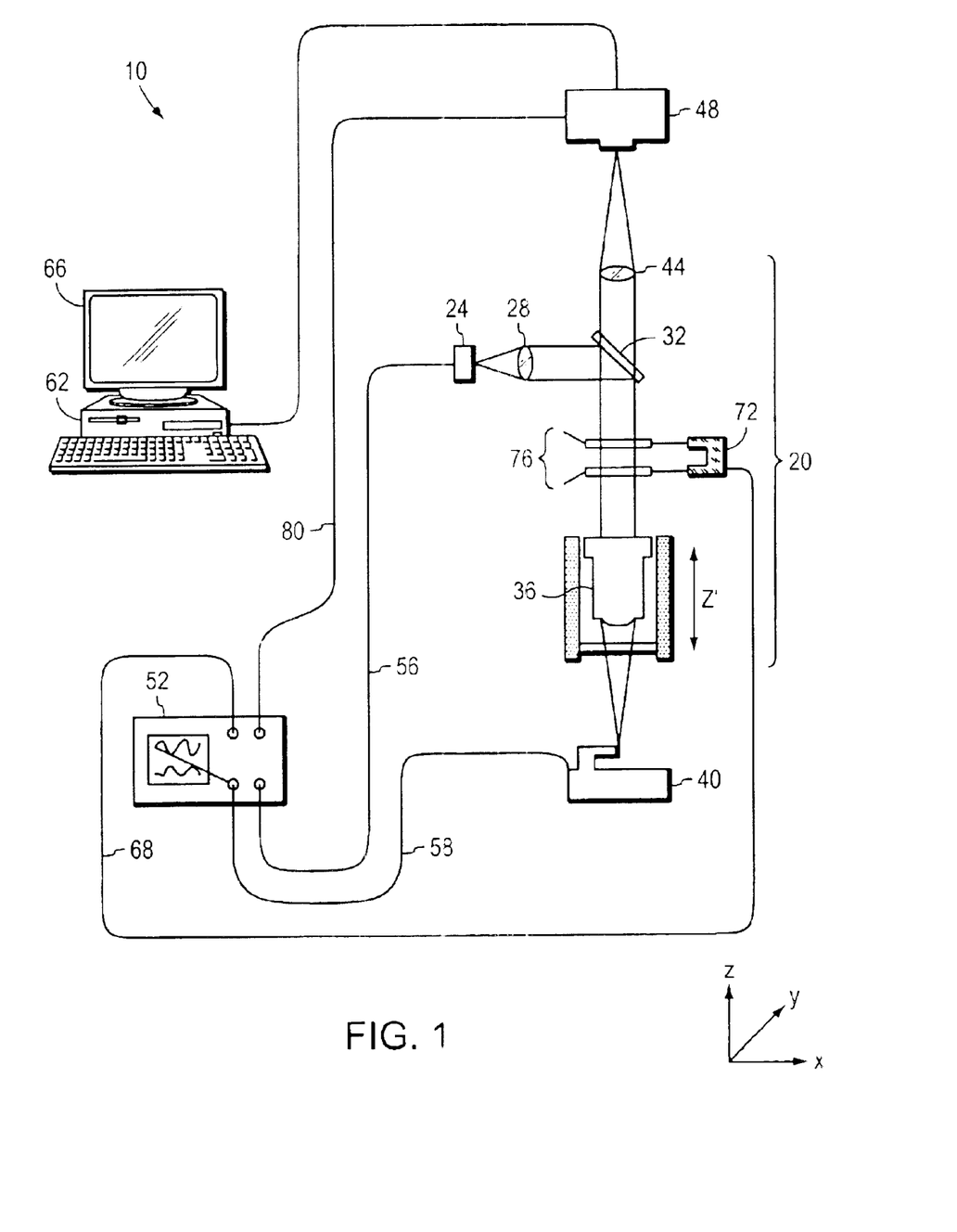
FIG. 1 is a schematic diagram of an embodiment of an interferometric measurement system suitable for use performing the method of the invention.

In brief overview, an embodiment of a system 10 capable of performing the method of the invention is depicted in FIG. 1. The system 10 includes an interferometer 20 which includes a strobable white-light source 24 and collimating lens 28 illuminating a beam splitter 32. Light impinging on the beam splitter 32 is partially reflected to a Mirau objective 36 which is scanable in the Z-direction. The Mirau objective 36 focuses the light onto the device 40 under test. The device 40 reflects the light back through the Mirau objective 36 and beam splitter 32 through a focusing lens 44 to be imaged on a detector 48, such as a camera or CCD array. In another embodiment the Mirau objective 36 is replaced with a Linnik interferometer lens. A split annulus focussing lens tube 76 is attached to a piezoelectric device 72 and positioned between the Mirau lens 36 and the beam splitter 32.

A signal generator 52 provides a first periodic driving signal 56 which strobes the white-light source 24; a second driving signal 58 which drives the device under test 40 in a periodic manner; a third driving signal 68 which drives the piezoelectric device 72 and alters the focus of the split annulus focussing lens tube 76, and finally a fourth signal 80 which controls the camera 48 to cause it to record an image. The fact that all of theses devices: the camera 48, the device 40, the strobable light source 24, and the piezoelectric device 72 are all driven by signals from the signal generator 52, means that the relative phase of the various components can be adjusted. The correlation between the strobing of the light source 24 and the taking of the images by the camera 48 results in the camera 48 taking stop action image frames of the device 40 in motion at various points in the device's trajectory. The images from the camera 48 are transmitted to a processor 62 and the trajectory of the device 40 is then calculated in accordance with the method described below and displayed on display 66.

Figure 2:
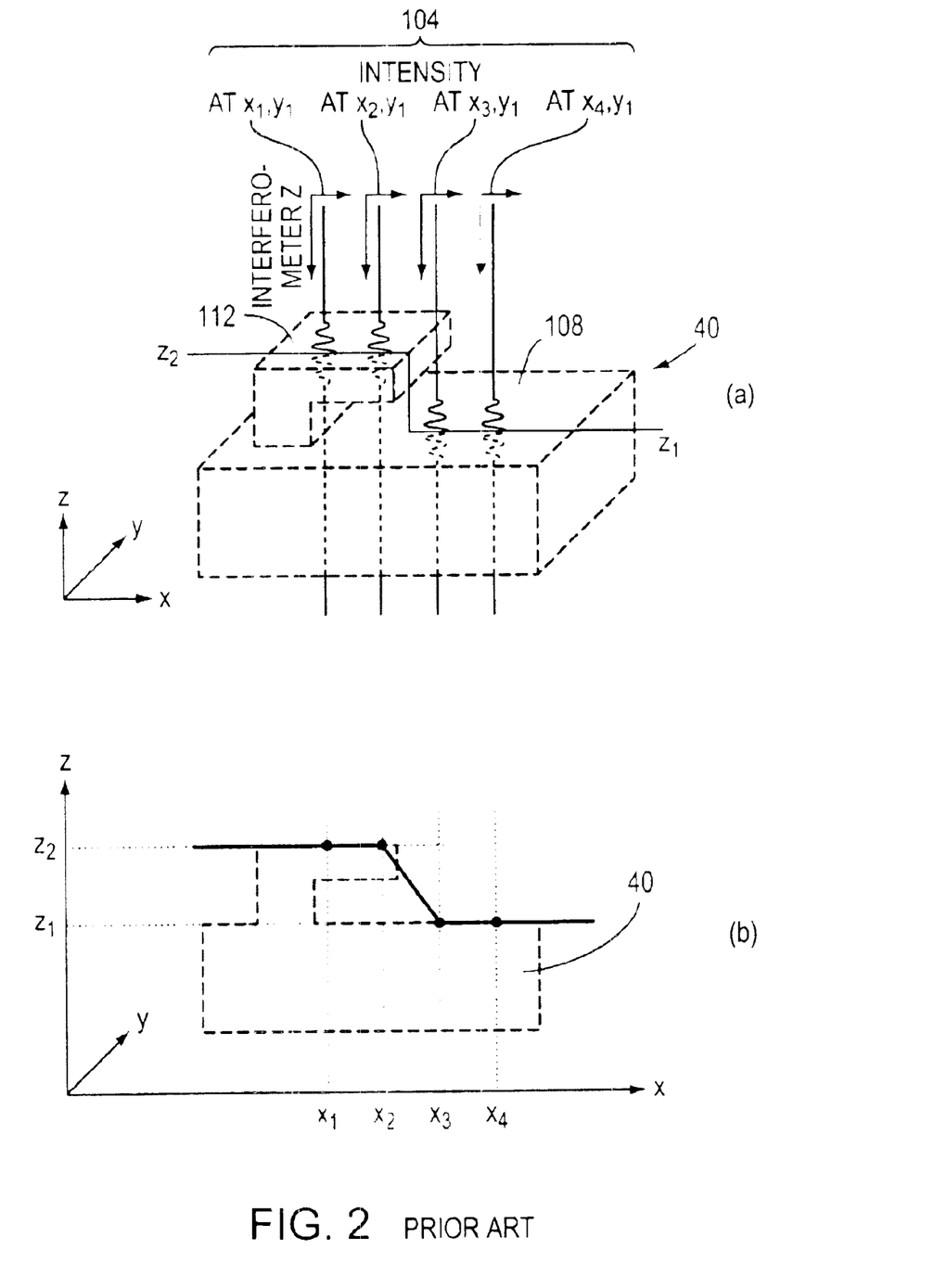

To understand the process of calculating the trajectory in accordance with the present invention it is important to consider the process of measuring the motion of a device as known to the prior art and shown in FIGS. 2(a–b). In this case, the device 40 which is static, is examined with an interference device known to the prior art and the interference patterns 108, 112 formed (FIG. 2a) are viewed as a series pixels 104 at a series of locations on the device 40. The images detected by the pixels 104 are then generally used to define the profile of the device 40 as shown in FIG. 2b.

Figure 3:
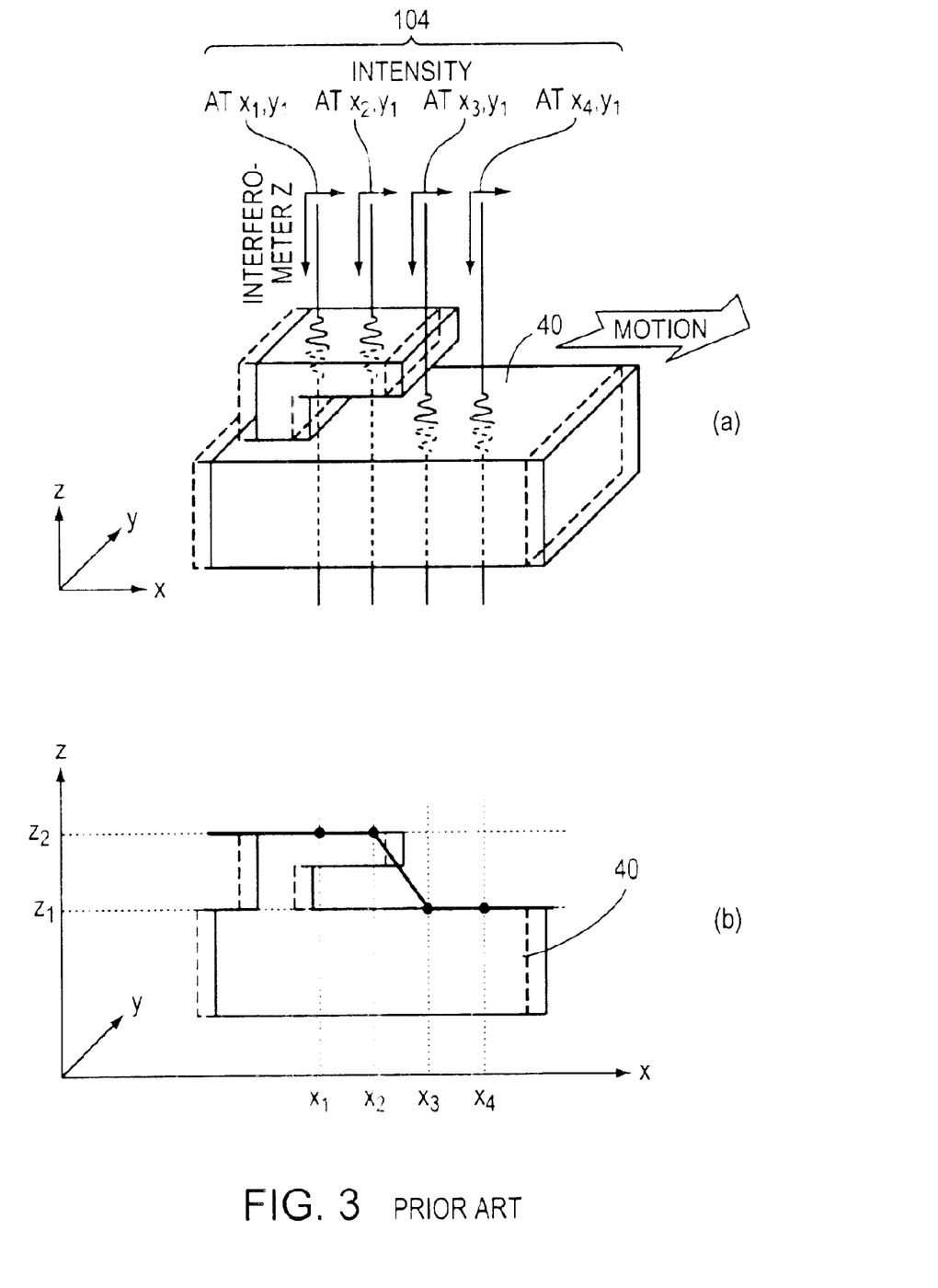

Now if the device 40 is moved slightly in the X-Y plane as shown in FIGS. 3(a–b) the fact that the motion is less than the pixel width, i.e. sub-pixel motion, causes the motion in the X-Y plane orthogonal to the optical axis of the interferometer to be undetected. This results in the Z-profile for the moving object (FIG. 3) and the static object (FIG. 2) to appear to be the same (FIG. 3b).

Figure 4:
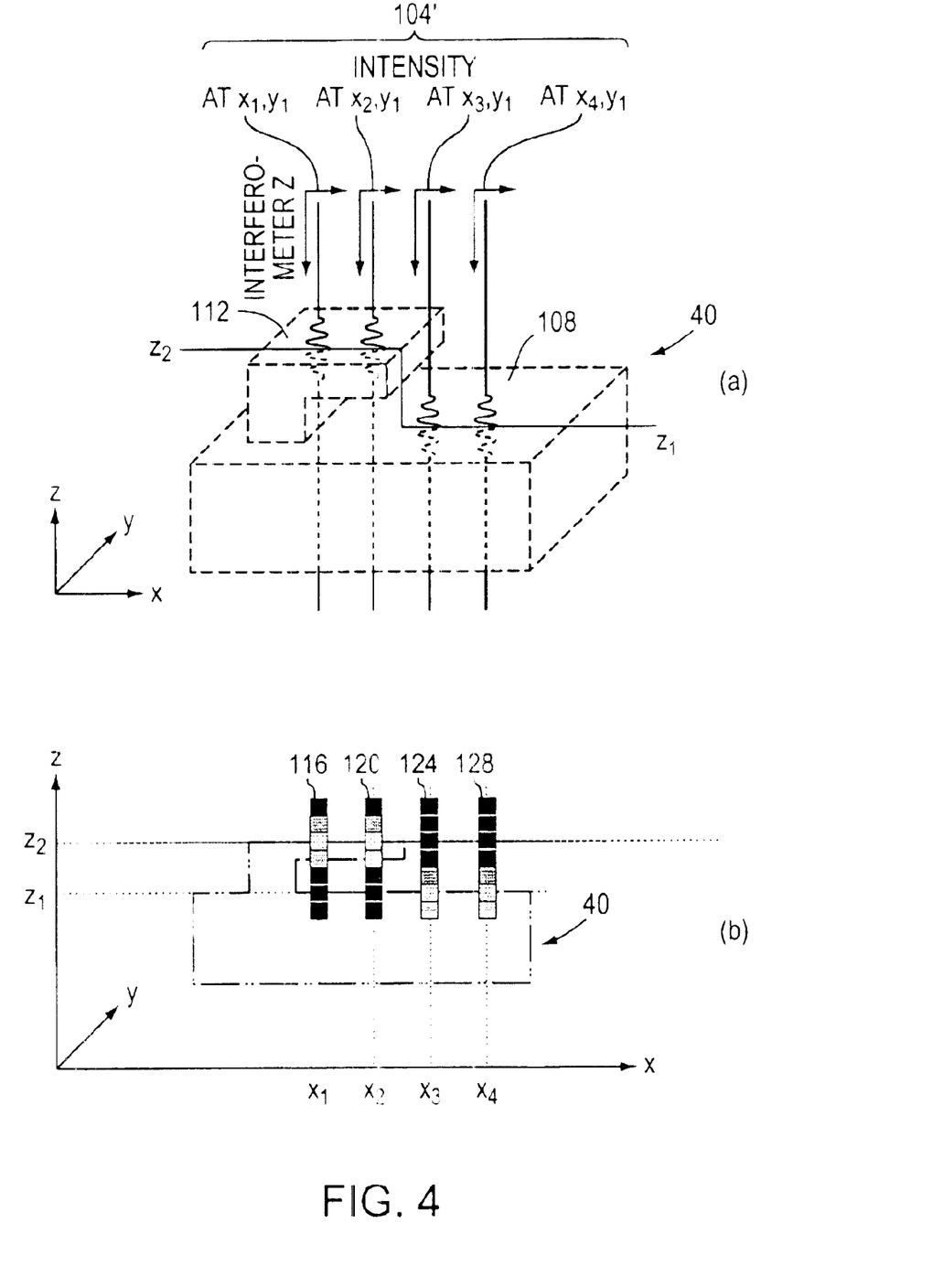

If instead the device 40 is statically measured using the strobed interferometer described above, additional information is obtained (FIG. 4). Specifically, at each pixel location 104' not only is the interference pattern detected but the intensity change of each pixel is recorded over time. That is, the intensity values over time at each pixel location (shown as a series of blocks of varying gray scale, 116, 120, 124, 128) are recorded. As with FIG. 2, the interference pattern is shown with an intensity maximum (white) at the surface of the device 40.

Figure 5:
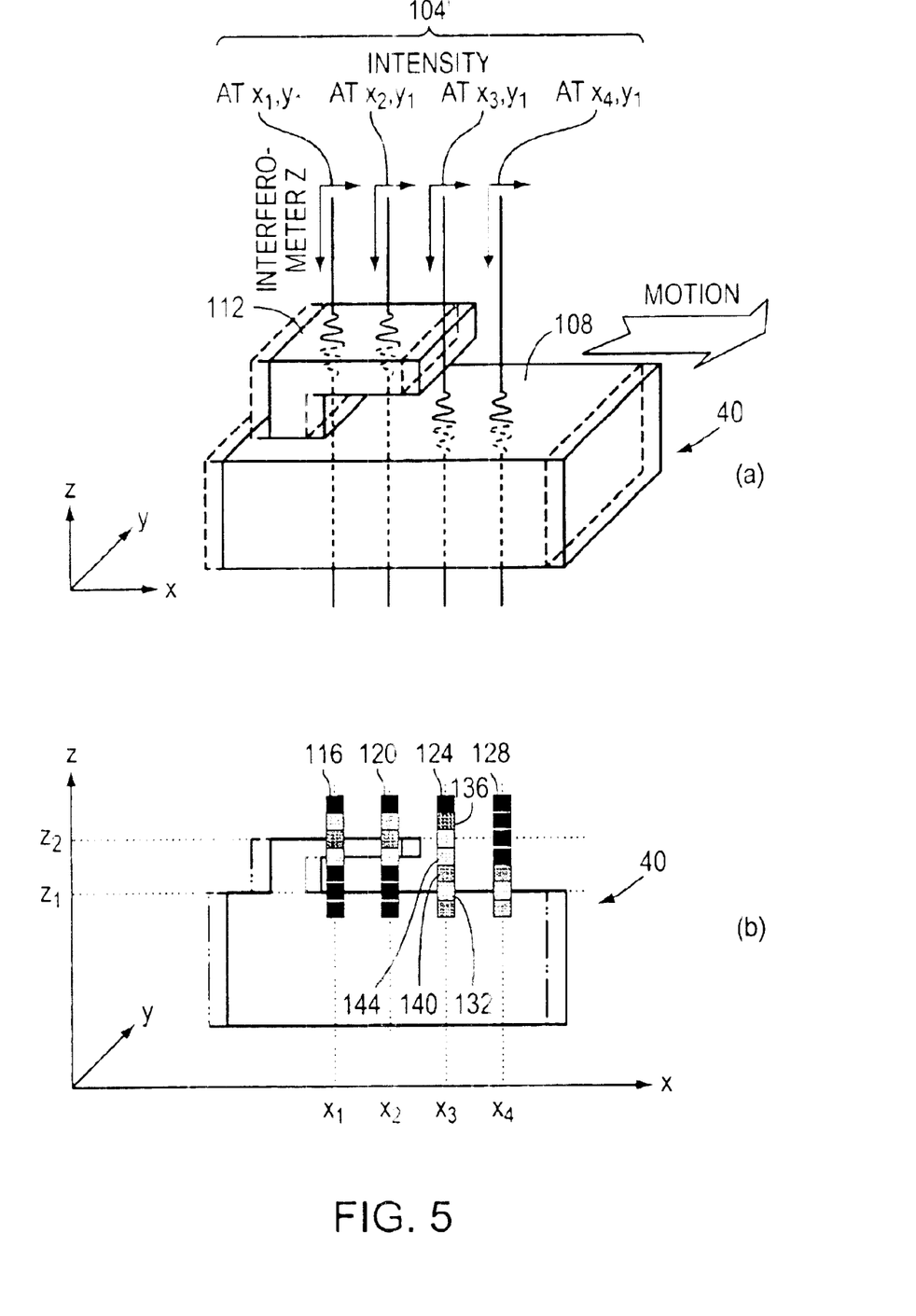

Now if the device 40 is moved (FIG. 5), the fact that pixel position 124 will see two interference patterns over time (that caused by the surface 108 and that caused by surface 112) provides additional information. This additional information is depicted in 124 as two relatively light images 132, 136 separated by darker images 140, 144. This information provides an indication that the camera 48 is seeing different surfaces (108, 112) of the device 40 at different times and hence the device 40 is moving in the X-Y plane. This information is can be interpreted because the three dimensional volume information about the device is not reduced to lower two dimensional information by profiling.

One basis for such interpretation is that the brightness of the three-dimensional interference pattern imaged on a moving object is a function (E) of the specific (x,y,z) location on the object and the point in time (t) at which the object was imaged; that is E(x, y, z, t). At a later time (t') the object will have moved to (x',y',z') and the interference pattern will have shifted. The brightness of the image at the new location is given by the function E(x',y',z',t'). This first constraint requires that because the interference pattern is only shifting, the brightness at times (t) and (t') should be equal. That is:

$$E(x, y, z, t) = E(x', y', z', t') \quad \text{(Eqn. 1)}$$

The new prime coordinates are related to the old unprimed coordinates as:

$$x' = x + \delta x$$

$$y' = y + \delta y$$

$$z' = z + \delta z$$

$$t' = t + \delta t$$

where the δx, δy, δz, and δt quantities (here after δ-quantities) represent small changes associated with the displaced target of interest.

Applying a Taylor expansion to (Eqn. 1), neglecting the higher order terms, and rearranging the parameters of the equation, the equation reduces, for small changes in the δ-quantities, to:

$$\frac{\partial E}{\partial t}dt + \frac{\partial E}{\partial x}dx + \frac{\partial E}{\partial y}dy + \frac{\partial E}{\partial z}dz = 0 \quad \text{(Eqn. 2)}$$

where dx, dy, and dz are displacements in the x, y, and z directions respectively and are associated with the current time-step. The partial derivative terms in (Eqn. 2) represent the temporal and spatial gradients in the image. In the case that the object is a rigid body within a viewing region (the rigid body constraint), the displacements dx, dy, and dz are not functions of x, y, and z, but rather are the same everywhere within that region. Thus a system of equations for three unknowns: dx, dy, and dz results. By solving (Eqn.

2) for the data elements of a given interferometric data volume (using, for example, a least squares method), the orthogonal displacement is measurable.

In one embodiment, each of the gradients in Eqn. 2 can be obtained from two sets of four-pixel images closely separated in time. From these gradients measured from these two sets of pixels, the motion in the plane orthogonal to the optical axis of the interferometer can be determined. If it is known that the motion is constrained, leading to fewer degrees of freedom, then two sets of two pixels are sufficient to make the determination.

Thus in operation, the computer 62 first acts as a gradient processor to calculate the gradients required by Eqn. 2 from the brightness measurements of the camera images. Next the computer 62 acts as a motion calculator to solve the equations arising from Eqn. 2 to thereby determine the motion of the object.

Figure 6:
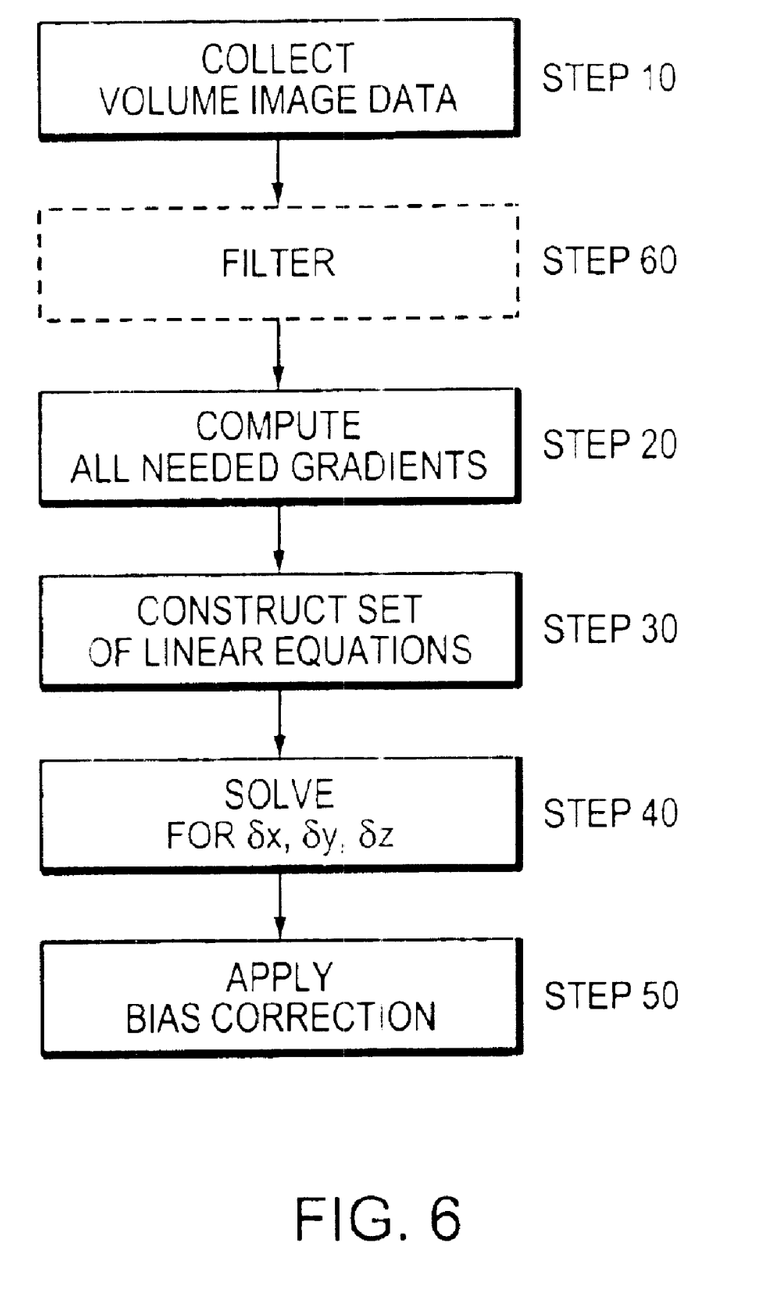
FIG. 6 is flow chart of the measurement steps according to one embodiment of the invention.

Thus the method for measuring a motion of an object substantially orthogonal to the optical axis of an interferometer is shown in FIG. 6. The method first obtains (Step 10) a first interferogram and a second interferogram each including intensity information of each of at least two pixels. Using the differences in the various pixel intensities, the intensity gradients are computed (Step 20). Constructing (Step 30) and solving (Step 40) Eqn. 2 for each point in the region of interest permits the displacements (the various δ's) of the object that occurred between time (t) and (t') to be determined (Step 40). Any bias correction that is required is then applied (Step 50). In another embodiment, prior to computing all the gradients (Step 20), the data is filtered (Step 60) to remove spurious data. One such filtering step (Step 60) is a low-pass filtering step.

In addition to these intensity gradients being measured in space and time domains as shown in the above embodiment, the intensity gradients can also be measured in a transform domain. In such a case, a transform such as the Fourier transform or a wavelet transform is first applied to the data and then the displacements are measured.

In yet another embodiment a feature on the object is selected as being in the region of interest. That feature may be an edge, a surface difference or simply a color change. By measuring the gradient change accompanying movement of such a feature, the change in position of the feature may be easily determined.

Although the gradients in the embodiments above are determined from intensity measurements made by the camera 48 at various times, other gradient calculations are possible. For example a gradient calculated from the difference between an intensity measurement of an object and the intensity measurement of another object stored previously can be used to compare the position of an object in a plane orthogonal to the optical axis of the interferometer with a prerecorded fiducial point. Also it is possible to calculate the gradient from the difference between an intensity measurement of an object and the intensity measurement which is a calculated value derived from a mathematical model. In this manner it is possible to compare the position of an object in a plane orthogonal to the optical axis of the interferometer with a model value.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for measuring a motion of an object substantially orthogonal to an optical axis of an interferometer comprising the steps of:

obtaining a first interferogram and a second interferogram, wherein each of said first and second interferograms comprises intensity information of each of at least two pixels; and determining the motion of the object from the first and the second interferograms in response to the difference of the intensity gradients of said pixels in the first and second interferograms in the orthogonal direction.

2. The method of claim 1 wherein the intensity gradients are computed from the intensity information of said each of at least two pixels.

3. The method of claim 1 wherein the determination of the motion measurement is substantially independent of the pixel dimensions.

4. The method of claim 1 wherein said intensity gradients are measured in space and time domains.

5. The method of claim 1 wherein said intensity gradients are calculated in a transform domain.

6. The method of claim 5 wherein the transform domain is a Fourier domain.

7. The method of claim 5 wherein the transform domain is a wavelet domain.

8. The method of claim 1 wherein at least one of said gradients comprise intensity information about a feature on said object.

9. The method of claim 8 wherein said feature comprises an edge.

10. The method of claim 8 wherein said feature comprises a difference in surface color.

11. A method of measuring a periodic vibration of a microstructure substantially orthogonal to an optical axis of an interferometer comprising the steps of:

obtaining a first interferogram and a second interferogram, wherein each of said first and second interferograms comprises intensity information of each of at least two pixels within each of said interferograms; and determining the motion of the microstructure from the first and the second interferograms in response to the difference of the intensity gradients of said pixels in the first and second interferograms in the orthogonal direction.

12. The method of claim 11 comprising measuring the periodic vibration using at least one phase of motion.

13. A system for measuring a motion of an object substantially orthogonal to an optical axis of an interferometer comprising:

a first interferogram comprising intensity information of each of at least two pixels;

a second interferogram comprising intensity information of each of at least two pixels;

a gradient processor calculating the intensity gradients of the first and second interferograms in the orthogonal direction; and a motion processor calculating the motion of the object from the first and the second interferograms in response to the difference of the intensity gradients of the first and second interferograms in the orthogonal direction.

14. The system of claim 13 wherein said gradient processor calculates the gradients in space and time domains.

15. The system of claim 13 wherein said gradient processor calculates gradients in a transform domain.

16. The system of claim 15 wherein the transform domain is a Fourier domain.

17. The system of claim 15 wherein the transform domain is a wavelet domain.

18. The system of claim 13 wherein the gradient processor and the motion processor are the same processor.

19. An apparatus for measuring a motion of an object comprising:

an interferometer having an optical axis recording a first interferogram and a second interferogram, each of said first and second interferograms comprising intensity information at each of at least two pixels arranged substantially orthogonal to the optical axis of the interferometer;

a gradient processor calculating the intensity gradients of the first and second interferograms in a direction orthogonal to the optical axis of the interferometer; and a motion processor calculating the motion of the object from the first and the second interferograms in response to the difference of the intensity gradients of the first and second interferograms in the orthogonal direction.

20. The apparatus of claim 19 wherein said gradient processor calculates the gradients in space and time domains.

21. The apparatus of claim 19 wherein said gradient processor calculates gradients in a transform domain.

22. The apparatus of claim 21 wherein the transform domain is a Fourier domain.

23. The apparatus of claim 21 wherein the transform domain is a wavelet domain.

24. The apparatus of claim 19 wherein the gradient processor and the motion processor are the same processor.

25. A method for measuring the relative location of an object comprising the steps of obtaining a first interferometric data set comprising intensity information at two locations on said object;

obtaining a second data set; and determining the relative location of said object in response to said first interferometric data set and said second data set, without forming a surface profile.

26. The method of claim 25 wherein said second data set comprises an interferometric data set comprising intensity information at two locations.

27. The method of claim 26 wherein said relative location comprises a change in location.

28. The method of claim 25 wherein said second data set comprises data obtained from a mathematical model.

29. The method of claim 25 wherein said interferometric data is obtained using a white light interferometer.

30. The method of claim 25 wherein said interferometric data set comprises interferometric data of a feature of said object.

31. The method of claim 30 wherein said feature is an edge of an object.

32. The method of claim 30 wherein said feature is a variation in surface color of said object.

33. An apparatus for measuring the relative location of an object, said apparatus comprising:

a first interferometric data set comprising intensity information at two locations on said object;

a second data set; and a processor determining the relative location of said object in response to said first interferometric data set and said second data set without forming a surface profile.

34. The apparatus of claim 33 wherein said second data set comprises an interferometric data set comprising intensity information at two locations.

35. The apparatus of claim 34 wherein said relative location comprises a change in location.

36. The apparatus claim 33 wherein said second data set comprises data obtained from a mathematical model.

37. The apparatus of claim 33 further comprising a white light interferometer for obtaining said first interferometric data set.

38. The apparatus of claim 33 wherein said interferometric data set comprises interferometric data of a feature of said object.

39. The apparatus of claim 38 wherein said feature is an edge of an object.

40. The apparatus of claim 38 wherein said feature is a variation in surface color of said object.

* * * * *